US010902566B2

(12) United States Patent
Sauder et al.

(10) Patent No.: US 10,902,566 B2
(45) Date of Patent: Jan. 26, 2021

(54) METHODS FOR AGRONOMIC AND AGRICULTURAL MONITORING USING UNMANNED AERIAL SYSTEMS

(71) Applicant: The Climate Corporation, San Francisco, CA (US)

(72) Inventors: Doug Sauder, Tremont, IL (US); Justin L. Koch, Tremont, IL (US); Troy L. Plattner, Tremont, IL (US); Phil Baurer, Tremont, IL (US)

(73) Assignee: THE CLIMATE CORPORATION, San Francisco, CA (US)

(*) Notice: Subject to any disclaimer, the term of this patent is extended or adjusted under 35 U.S.C. 154(b) by 0 days.

(21) Appl. No.: 16/438,128

(22) Filed: Jun. 11, 2019

(65) Prior Publication Data

US 2019/0333195 A1 Oct. 31, 2019

Related U.S. Application Data

(63) Continuation of application No. 15/853,356, filed on Dec. 22, 2017, now Pat. No. 10,346,958, which is a (Continued)

(51) Int. Cl.
*G06K 9/00* (2006.01)
*G06T 5/00* (2006.01)
(Continued)

(52) U.S. Cl.
CPC ............ *G06T 5/006* (2013.01); *A01B 79/005* (2013.01); *G05D 1/0094* (2013.01); *G05D 1/106* (2019.05);
(Continued)

(58) Field of Classification Search
CPC .............. G06K 9/0063; G06K 9/00657; G06T 2207/30188
See application file for complete search history.

(56) References Cited

U.S. PATENT DOCUMENTS 7,911,517 B1 * 3/2011 Hunt, Jr. .............. G06K 9/0063
348/272
8,315,477 B2 * 11/2012 Acree .................... G01C 11/00
348/61
(Continued)

FOREIGN PATENT DOCUMENTS

| CN | 1948904 A | 4/2007 |
| CN | 103425102 A | 12/2013 |
| CN | 103523224 A | 1/2014 |

OTHER PUBLICATIONS

Colombian Claims in application No. NC2017/0002677, dated Sep. 2018, 7 pages.
(Continued)

*Primary Examiner* — Guillermo M Rivera-Martinez
(74) *Attorney, Agent, or Firm* — Hickman Palermo Becker Bingham LLP; Malgorzata A. Kulczycka (57) ABSTRACT

A method for agronomic and agricultural monitoring includes designating an area for imaging, determining a flight path above the designated area, operating an unmanned aerial vehicle (UAV) along the flight path, acquiring images of the area using a camera system attached to the UAV, and processing the acquired images.

20 Claims, 7 Drawing Sheets

Related U.S. Application Data continuation of application No. 14/831,165, filed on Aug. 20, 2015, now Pat. No. 9,922,405.

(60) Provisional application No. 62/040,859, filed on Aug. 22, 2014, provisional application No. 62/046,438, filed on Sep. 5, 2014.

(51) Int. Cl.
*G06T 11/60* (2006.01)
*G05D 1/00* (2006.01)
*A01B 79/00* (2006.01)
*G05D 1/10* (2006.01)

(52) U.S. Cl.
CPC .......... *G06K 9/00657* (2013.01); *G06T 11/60* (2013.01); *B64C 2201/123* (2013.01)

(56) References Cited

U.S. PATENT DOCUMENTS

| | | | |
|---|---|---|---|
| 8,731,836 B2 | 5/2014 | Lindores et al. | |
| 9,922,405 B2 | 3/2018 | Sauder et al. | |
| 2001/0036295 A1* | 11/2001 | Hendrickson | G01J 3/2823 382/110 |
| 2009/0256909 A1 | 10/2009 | Nixon | |
| 2010/0004802 A1 | 1/2010 | Bodin et al. | |
| 2011/0135197 A1* | 6/2011 | Paris | G06T 7/00 382/165 |
| 2011/0282578 A1 | 11/2011 | Miksa | |
| 2012/0101861 A1* | 4/2012 | Lindores | G06Q 10/063 705/7.11 |
| 2012/0237083 A1* | 9/2012 | Lange | G06F 16/29 382/103 |
| 2013/0114641 A1* | 5/2013 | Sutton | G01N 33/0098 374/121 |
| 2014/0012732 A1* | 1/2014 | Lindores | G06Q 50/02 705/37 |
| 2014/0035752 A1 | 2/2014 | Johnson | |
| 2014/0039967 A1* | 2/2014 | Scharf | G06K 9/00657 705/7.25 |
| 2014/0089045 A1* | 3/2014 | Johnson | G06Q 50/02 705/7.31 |
| 2014/0107957 A1 | 4/2014 | Lindores et al. | |
| 2014/0146173 A1* | 5/2014 | Joyce | G06K 9/0063 348/144 |
| 2014/0301607 A1* | 10/2014 | Anderson | G06K 9/00657 382/110 |
| 2014/0303814 A1 | 10/2014 | Burema et al. | |
| 2014/0312165 A1* | 10/2014 | Mkrtchyan | B64D 47/08 244/13 |
| 2014/0316616 A1* | 10/2014 | Kugelmass | G08G 5/0013 701/8 |
| 2015/0022656 A1* | 1/2015 | Carr | G01C 11/025 348/117 |
| 2015/0254800 A1* | 9/2015 | Johnson | G06Q 50/02 382/141 |
| 2015/0294154 A1* | 10/2015 | Sant | G06K 9/00651 382/110 |
| 2015/0310633 A1* | 10/2015 | Nelan | G06T 7/0002 382/110 |
| 2017/0124745 A1* | 5/2017 | Christ | G01C 11/04 |
| 2018/0158179 A1 | 6/2018 | Sauder | |

OTHER PUBLICATIONS

Colmbian Patent Office, "Search Report" in application No. NC2017/0002677, dated Sep. 18, 2018, 5 pages.

European Patent Office, "Search Report" in application No. 15 834 359.0-1004, dated Feb. 3, 2020, 5 pages.

European Claims in application No. 15 834 359.0-1004, dated Feb. 2020, 5 pages.

Australian Patent Office, "Search Report" in application No. 2015/305406, dated Mar. 13, 2020, 3 pages.

Australian Claims in applicaito No. 2015/305406, dated Mar. 2020, 6 pages.

Sauder, U.S. Appl. No. 15/853,356, filed Dec. 22, 2017, Notice of Allowance, dated Mar. 5, 2019.

Australian Patent Office, "Search Report" in application No. 2015305406, dated Apr. 30, 2020, 4 pages.

Australian Claims in application No. 2015305406, dated Apr. 2020, 6 pages.

State Enterprise Ukrainian Institute of Intellectual Property, "Preliminary Conclusion of the Substantive Examination" in application No. a 2017 02686, dated Aug. 26, 2020, 3 pages.

Claims in Ukrainian application No. a 2017 02686, dated Aug. 2020, 7 pages.

Australian Patent Office, "Search Report" in application No. 2015305406, dated Jun. 30, 2020, 4 pages.

Australian Claims in application No. 2015305406, dated Jun. 2020, 6 pages.

Patent Office of India, "Examination Report" in application No. 201717008175, dated Oct. 21, 2020, 8 pages.

Indian Claims in application No. 201717008175, dated Oct. 2020, 6 pages.

Brazil Patent Office, "Search Report" (with English translation) in application No. 1120170036789, dated Nov. 17, 2020, 6 pages.

Brazil Claims in application No. 1120170036789, dated Nov. 2020, 6 pages.

\* cited by examiner

METHODS FOR AGRONOMIC AND AGRICULTURAL MONITORING USING UNMANNED AERIAL SYSTEMS

BENEFIT CLAIM

This application claims the benefit under 35 U.S.C. § 120 as a continuation of application Ser. No. 15/853,356, filed Dec. 22, 2017, which is a continuation of application Ser. No. 14/831,165, filed Aug. 20, 2015, issued U.S. Pat. No. 9,922,405 on Mar. 20, 2018, which claims the benefit under 35 U.S.C. 119(e) of provisional application 62/040,859, filed Aug. 22, 2014, and provisional application 62/046,438, filed Sep. 5, 2014, the entire contents of which are hereby incorporated by reference as if fully set forth herein.

FIELD

This disclosure generally relates to agronomic and agricultural monitoring, and more specifically, to methods for agronomic and agricultural monitoring using unmanned aerial systems or drones.

BACKGROUND

Unmanned aerial vehicles (UAVs), sometimes referred to as drones, are remotely piloted or self-piloted aircraft that may carry sensors, communications equipment, cameras or other payloads. UAVs have been used for military reconnaissance and intelligence-gathering, as well as for capturing terrestrial images for civilian applications. While UAVs have also been used for agricultural monitoring, such systems are not entirely satisfactory. An improved UAV for agricultural use is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

One aspect is a method for agronomic and agricultural monitoring. The method includes designating an area for imaging, determining a flight path above the designated area, operating an unmanned aerial vehicle (UAV) along the flight path, acquiring images of the area using a camera system attached to the UAV, and processing the acquired images.

Another aspect is a system for agronomic and agricultural monitoring. The system includes a computing device configured to designate an area for imaging, and determine a flight path above the designated area. The system further includes an unmanned aerial vehicle communicatively coupled to the computing device and having a camera system, the unmanned aerial vehicle configured to travel along the flight path, acquire images of the area using the camera system, and process the acquired images.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
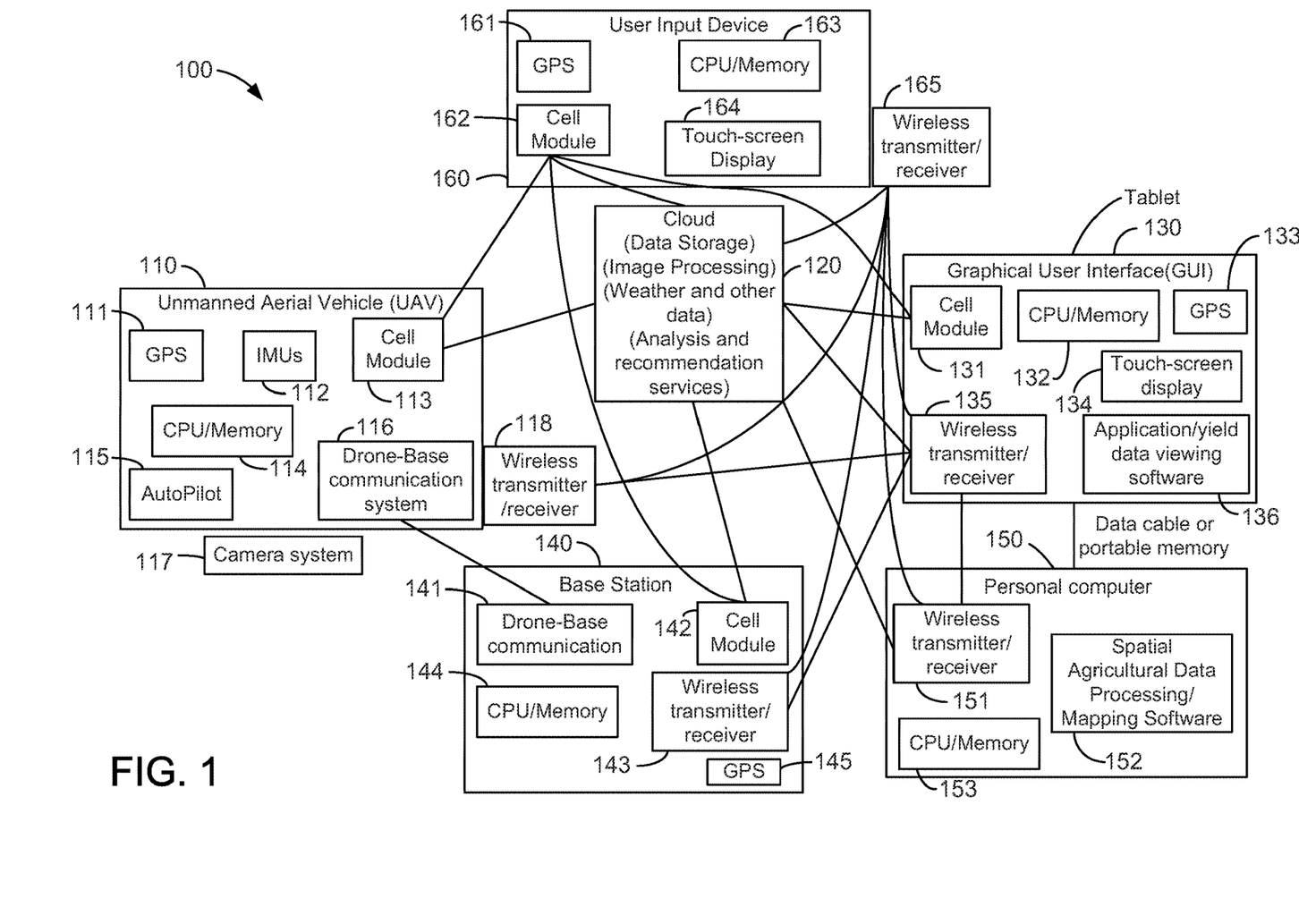
FIG. 1 is a block diagram of a system for use in agronomic and agricultural monitoring.

Referring initially to FIG. 1, an example of an unmanned aerial system of the present disclosure is indicated generally at 100. Unmanned aerial system 100 includes a plurality of components including an unmanned aerial vehicle (UAV) 110, a cloud 120, a graphical user interface (GUI) 130 (e.g., implemented using a tablet computing device), a base station 140, a personal computer 150, and a user input device (UID) 160. The components of system 100 will be described in more detail below.

In this embodiment, the components of system 100 are communicatively coupled with one another via one more communications media (e.g., direct cable connection, cloud computing networks, the Internet, local area networks (LAN), wireless local area networks (WLAN) (e.g., 802.11ac standard), or wide area networks (WAN)). Accordingly, components of system 100 may include a wireless transmitter and receiver (e.g., 118, 135, 143, 151, 165) and/or a cellular transfer module (e.g., 113, 131, 142, 162) to facilitate wireless communication between components. Additionally, one or more of the components (110, 120, 120, 140, 150, and 160) may include a global positioning system (GPS) therein (e.g., 111, 133, 145, 153, and 161) for determining a position of the associated component, normalizing GPS data between components, and enabling triangulation calculations for position determinations.

In this embodiment, unmanned aerial vehicle 110 is a remote piloted or self-piloted aircraft which may be hover-capable (e.g., a helicopter or rotorcraft) or may be fixed wing. An example of a hover-type "quadricopter" UAV is described in U.S. Patent Application Publication No. 2013/0176423, which is hereby incorporated by reference in its entirety. In the systems and methods described herein, UAV 110 assists agricultural and farming operations by mapping and monitoring agricultural status and evolution.

In this embodiment, unmanned aerial vehicle (UAV) 110 includes a suitable global positioning system (GPS) 111 that provides the location of UAV 110 using, e.g., GPS satellites orbiting Earth. Location and time data may be provided to a user (e.g., human operator) or to a computer that automatically controls the vehicle. An elevation sensor (e.g., sonar) may be part of GPS system 111 for determining elevation of UAV 110 during flight. UAV 110 also includes one or more mounted inertial measurement units (IMUs) 112 that measure and report the velocity, orientation, and gravitational forces of UAV 110 using a combination of mounted accelerometers, gyroscopes, and/or magnetometers. In cooperation with GPS 111 and IMUs 112, an autopilot capability 115 on UAV 110 controls take-off, in-flight navigation, and landing operations. For communication during return flight operations, UAV 110 has a drone-base communication system 116 that includes a radio transmitter and receiver (e.g., 900 MHz or 1.2 GHz) to communicate with a point of origin, such as base station 140, while in flight.

In the example embodiment, UAV 110 also includes a camera system 117 mounted to its underside for acquiring images during flight. Camera system 117 may hang from UAV 110 by gravity using a set of gimbals that allow rotation about a plurality of axes. The gimbals may include dampers that slow down reactions to changes in orientation of UAV 110 during flight. Alternatively, camera system 117 may be mounted directly to UAV 110 and be controlled by the movement of actuators. Camera system 117 may include a still photo camera, a video camera, a thermal imaging camera, and/or a near infrared (NIR) camera for capturing normalized difference vegetation index (NDVI) images. Alternatively, camera system 117 may include any image acquisition device that enables system 100 to function as described herein.

Camera system 117 and positioning of camera system 117 is controlled by an on-board central processing unit (CPU) and memory storage unit 114. The central processing unit (CPU) may include a microprocessor. CPU and memory storage unit 114 facilitates arithmetical, logical, and input/output operations of the on-board CPU. CPU and memory storage unit 114 may also assist and/or control other aspects of UAV 110, as discussed herein. For example, in some embodiments, CPU and memory storage unit 114 receives information from IMUs 112 during in-flight operations to assist with orientation of the camera system 117 and/or to detect whether or not conditions (e.g., light, speed, angle, etc.) are adequate to capture useful, visible images. UAV 110 may also include one or more sensors (e.g., an incident light sensor) coupled to CPU and memory storage unit 114 for monitoring ambient conditions.

In the example embodiment, base station 140 includes a drone-base communication system 141 comprising a radio transmitter and receiver (e.g., 900 MHz or 1.2 GHz) to facilitate communicating with UAV 110 while in flight. Base station 140 also includes a GPS system 145 and a CPU and memory storage unit 144 similar to those discussed above in relation to UAV 110.

In this embodiment, personal computer (PC) 150 is a computing device such as a laptop or desktop. PC 150 includes a CPU and memory storage unit 153, and also includes spatial agricultural data processing and mapping software (e.g., Farm Works Software® or SST Summit Professional®) installed thereon. In one embodiment, PC 150 may serve as a user interface for system 100.

System 100 also includes a graphical user interface (GUI) 130 that serves as a portable user interface. GUI 130 may be implemented using a tablet or other portable computing device that allows the user, or operator, to control system 100. In particular, GUI 130 may allow the user to designate flight paths of UAV 110 and/or identify aerial obstacles which may otherwise obstruct the flight path of UAV 110. In this embodiment, GUI 130 includes an application ("app") or viewing software 136 which allows the user to remotely access spatial maps including data regarding harvest, yield, and/or nitrogen content created from images taken by UAV 110. For example, GUI 130 may include software similar to that described in International Patent Application Publication No. WO 2014/026183, which is hereby incorporated by reference in its entirety. Accordingly, GUI 130 includes a CPU and memory storage unit 132, and is in communication with other components of system 100.

System 100 also includes the user interface device (UID) 160 (e.g., a joystick or keypad) that allows the user, or operator, to control system 100. In particular, UID 160 may allow the user to designate flight paths of UAV 110 and/or identify aerial obstacles which may otherwise obstruct the flight path of UAV 110. In this embodiment, UID 160 includes a display 164 which allows the user to remotely view images from camera system 117. Accordingly, IUD 160 includes a CPU and memory storage unit 163, and is in communication with other components of system 100. In one embodiment, the UID 160 may allow the user or operator to control the UAV 110 while viewing images from camera system 117 on touch screen display 134 on GUI 130.

In this embodiment, cloud 120 is a data storage, image processing, and computing hub for the unmanned aerial system 100. More specifically, cloud 120 is a set of interconnected computers and servers connected through a communication network to allow distributed computing. For example, cloud 120 could be a remote data storage center. Cell module 113 mounted to UAV 110 allows photographs to be uploaded to cloud 120 while UAV 110 is in flight. Cloud 120 may receive and store current and forecasted weather information including air temperature and precipitation amounts. Cloud 120 may also communicate with one or more analysis and recommendation services that provide analysis and/or recommendations based on image data acquired using UAV 110.

In one embodiment, UAV 110 transmits images taken with camera system 117 during flight to other components (e.g., 130, 140, 150, 160) for storage and/or processing. Images and metadata uploaded from the UAV 110 to cloud 120 may be orthorectified and stitched together to create a single contiguous image. Examples of orthorectifying oblique imagery to a singular view are described, for example, in U.S. Pat. No. 8,512,266, which is hereby incorporated by reference in its entirety.

Figure 2:
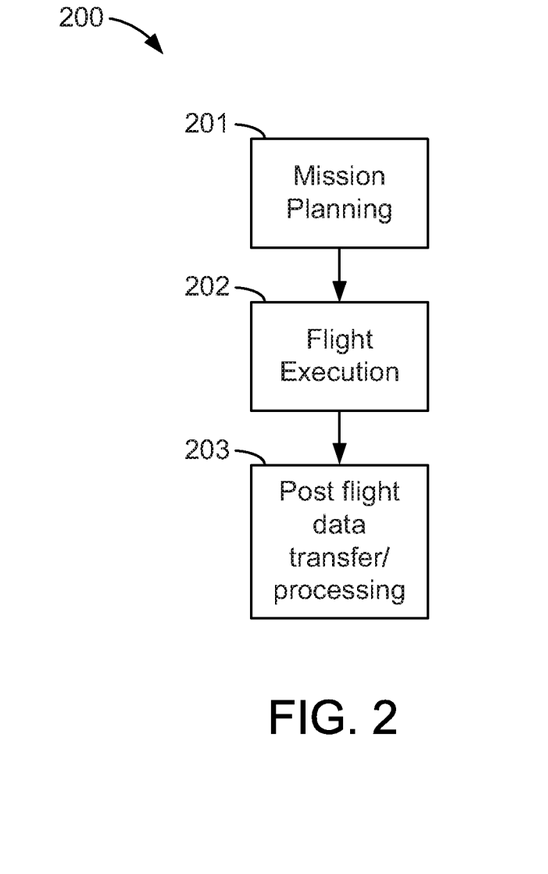
FIG. 2 is a flowchart of a method for operating an unmanned aerial vehicle for agronomic and agricultural monitoring that may be used with the system shown in FIG. 1.

Referring to FIG. 2, an example of a method of operating an unmanned aerial system, such as system 100, is indicated generally at 200. In this embodiment, method 200 includes three stages: a mission planning stage 201, a flight execution stage 202, and a post flight data transfer/processing stage 203. The three stages of method 200 will be described in more detail below.

Figure 3:
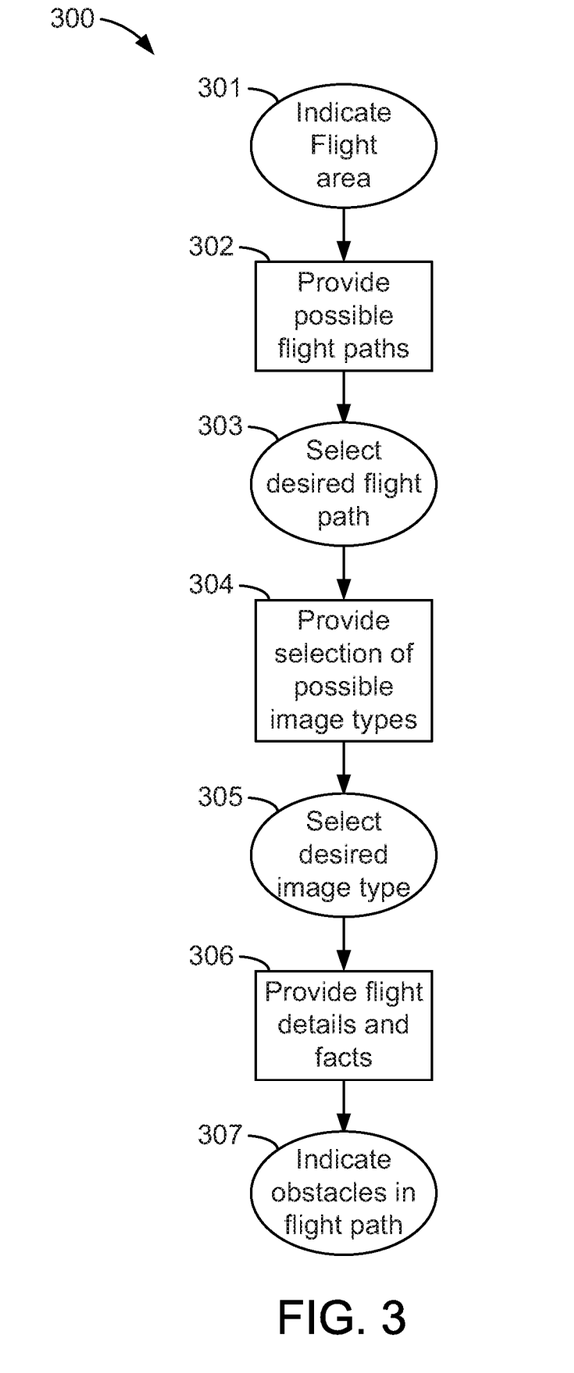
FIG. 3 is a flowchart of a mission planning stage of the method shown in FIG. 2.

Referring to FIG. 3, an example of the mission planning stage of method 200 is indicated generally at 300. Mission planning stage 300 of method 200 includes a sequence of actions performed by the user and the system 100. In FIG. 3, actions performed by the user are provided in a circle and actions performed by system 100 are provided in a square.

In the example method 200, following activation of the system 100, the user first indicates the flight area 301 for mapping. In one embodiment, the user outlines the flight area to be covered by UAV 110 on GUI 130 or UID 160 using map data from Google Maps® or other GPS software.

In one embodiment, system 100 analyzes the user's flight area 301 input, calculates possible flight path(s) to generate a contiguous image of the flight area, and provides the user with possible UAV flight paths 302. System 100 may also identify potential obstacles (e.g., telephone poles and/or electrical lines) in the flight path based on previous flights and/or user input, and may adjust the flight path accordingly. In another embodiment, system 100 provides the user with multiple possible UAV flight paths at different elevations and velocities depending upon the desired image resolution and flight duration. For example, and for purposes of illustration, system 100 could provide the user with two optional UVA flight paths on GUI 130 or UID 160 as provided in Table 1 below:

TABLE 1

| Path # | Elevation (ft) | Resolution | Duration (min) |
|---|---|---|---|
| 1 | 50 | High | 30 |
| 2 | 100 | Low | 15 |

In the example method 200, once provided with possible flight paths, the user selects a desired flight path 303. In one embodiment, the user may request system 100 provide additional flight path options by entering specific parameters for the flight path (i.e., elevation, picture resolution, duration, etc.).

In the example method 200, upon the user selecting a desired flight path, system 100 provides the user with a selection of possible image types to be taken by camera system 117. In one embodiment, user has the option of selecting 305 from still photos, thermal images, near infrared (NIR) images, and videos that visible light, thermal, and/or NIR imaging. For example, GUI 130 or UID 160 may provide the user with a list that allows the user to select the desired image type 304 (e.g., by displaying a checkbox or other selection mechanism). Based on the image types selected by the user, in some embodiments, GUI 130 or UID 160 determines an optimized elevation and/or estimates a flight time.

In the example method 200, system 100 provides the user with flight details and facts 306 on GUI 130 or UID 160. In one embodiment, the system 100 may provide the user with the route, elevation and/or duration of the UAV flight, as well as the anticipated resolution of images to be taken in the selected image type. In another embodiment, prior to generating flight paths, system 100 determines whether flight obstacles (e.g., telephone poles or electrical lines) have been previously identified in the applicable flight area. In yet another embodiment, the user identifies flight obstacles 307 on GUI 130 or UID 160 using satellite imagery from Google Earth® or another imagery provider. Specifically, in one embodiment, GUI 130 or UID 160 enables the user to draw a border around any flight obstacles and to enter the approximate height of the obstacle to prevent the UAV from entering the obstructed area. Using the input from the user, system 100 recalculates the flight path to avoid the obstacles.

Figure 4:
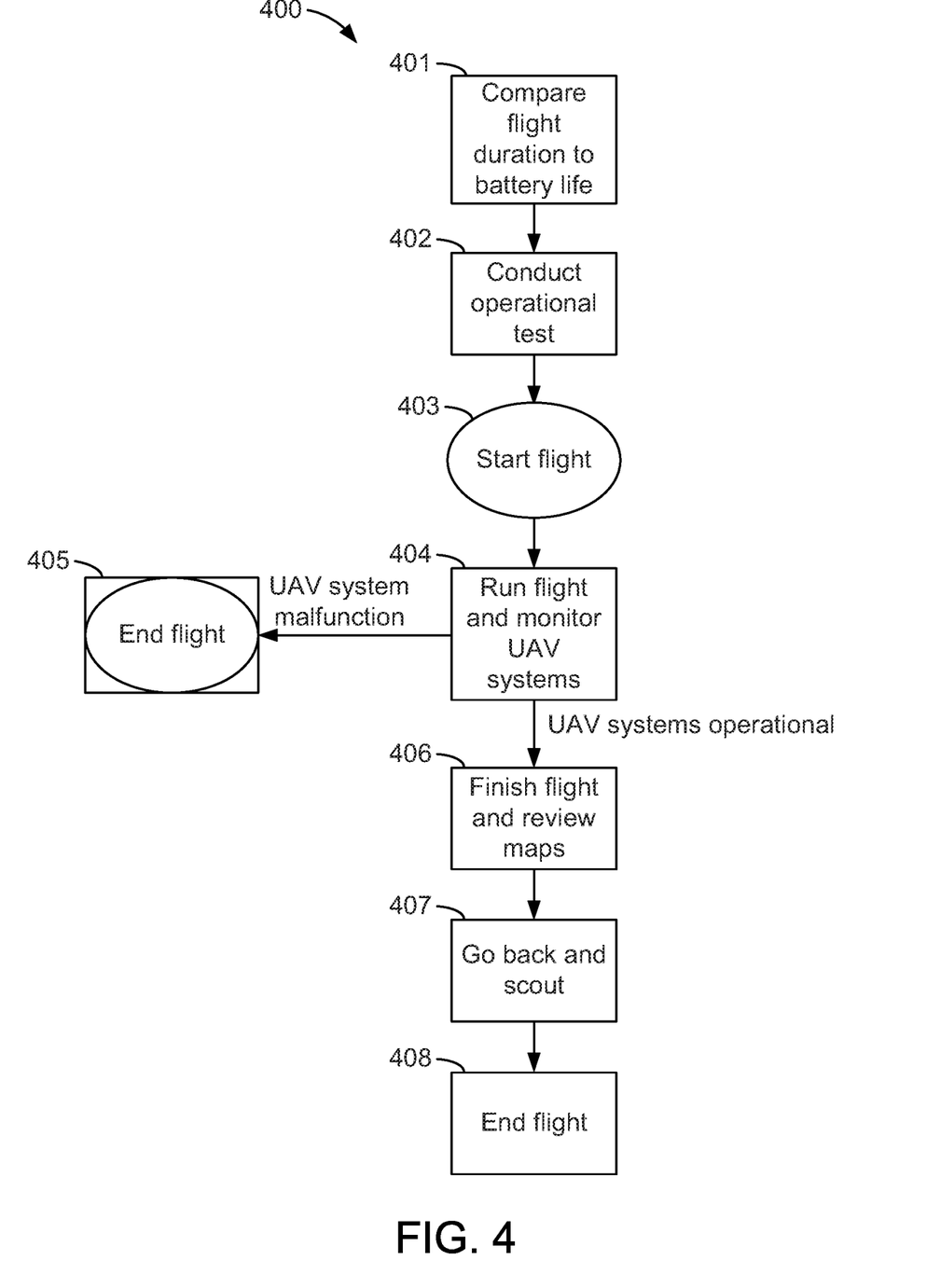
FIG. 4 is a flowchart of a flight execution stage of the method shown in FIG. 2.

Referring to FIG. 4, an example of the flight execution stage of method 200 is indicated generally at 400. Flight execution stage 400 of method 200 includes a sequence of actions performed by the user and system 100. In FIG. 4, actions performed by the user are provided in a circle and actions performed by system 100 are provided in a square.

In the example method 200, flight execution stage 400 occurs after mission planning stage 201. In one embodiment, the user directs system 100 to start the flight execution stage 400 using GUI 130 or UID 160. In another embodiment, flight execution stage 400 automatically commences following the identification of obstacles, if any, in the UAV flight path.

In the example method 200, flight execution stage 400 begins with system 100 comparing the flight duration and elevation to a battery life 401 of UAV 110. When a level of battery charge is insufficient, system 100 provides an indication to the user (e.g., on GUI 130 or UID 160) that charging is required. In addition to a power check, system 100 also performs an operational test of the system components, particularly UAV 110. In one embodiment, the system 100 conducts an operation test 402 to confirm the necessary cameras on camera system 117 are installed and operational, that weather conditions are safe for UAV flight, that the area surrounding UAV 110 is clear and safe for take-off, and that GPS coordinates of UAV 110 are correct.

In the example method 200, following confirmation by system 100 that UAV 110 capable and ready for operation, the user is prompted by system 100, via GUI 130 or UID 160, to start flight 403. In one embodiment, the user pushes a "start flight" or "go" button on GUI 130 or UID 160. Upon initiation of flight, system 100 commences the UAV flight and continually monitors UAV systems 404. In one embodiment, UAV 110 performs one or more test maneuvers. For example, UAV 110 may take off vertically from base station 140 and perform simple maneuvers (e.g., moving back and forth, side to side, up and down, etc.) to check operation and maneuvering capabilities. In the event of a UAV or system malfunction at any time during flight, system 100 and user have the ability to end the flight prematurely 405. In such an instance, the selected flight path is terminated, and UAV 110 returns to base station 140 and/or attempts to return to the ground without damaging UAV 110.

In the example method 200, during flight of UAV 110, camera system 117 takes pictures or video of the selected flight area and stores the images on on-board CPU and memory storage unit 114. In one embodiment, on-board CPU and memory storage unit 114 orthorectifies the imagery to a singular view and identifies areas with low quality imagery.

In some embodiments, UAV 110 acquires an initial set of images, and then returns to one or more target areas to acquire additional images at a higher resolution after reviewing the initial image maps 406. For example, camera system 117 may acquire NDVI images of the selected flight area, identify areas with low nitrogen levels (or other problems) via the NDVI map, and display these areas to the user via GUI 130 to enable the user to instruct UAV 110 to acquire additional, low-elevation (e.g., between 10 and 50 feet above the ground), high resolution ("scouting") pictures. In one embodiment, images of a planted population (e.g., corn, soybean, etc.) are captured by camera system 117 from an aerial view before the planted population reaches a mature length (i.e., at a time when individual plants are indistinguishable from neighboring plants).

In another embodiment, UAV 110 automatically flies a "Go Back and Scout" route 407 following a first pass over the selected flight area to take additional high resolution pictures of target areas (e.g., areas with low nitrogen levels) shown in the NDVI imagery. In yet another embodiment, additional high resolution pictures of target areas are taken to eliminate crop shadows. In such embodiments, to reduce processing time, image processing and analysis may be performed on-board UAV 110.

In the example method 200, following the UAV's completion of the flight path, the UAV lands (e.g., at base station 140) to end the flight 408.

In the example method 200, upon completion of the flight execution stage 400, post flight data transfer/processing stage 203 commences. Alternatively, data transfer/processing may occur while UAV 110 is still airborne such that data transfer/processing stage 203 overlaps flight execution stage 400. Hence, transfer and processing of the imagery obtained by UAV 110 may occur in real-time as the data is captured, or shortly thereafter (e.g., within 10 minutes of data capture). In one embodiment, low-quality images are constantly transmitted to GUI 130 or UID 160 during flight to keep the user apprised of the status of the flight.

Transferring the data and images captured by UAV 110 may be done via wireless and/or cellular communication between the components of the system 100. The transfer is typically directed to the component where processing will be executed.

Processing the data and images may include orthorectification and stitching of the aerial images into a single contiguous area map. Notably, processing of the data and images may be performed using any component of system 100. For example, processing may be performed on-board UAV 110, and the processed images may then be transferred to base station 140, GUI 130, and/or UID 160.

In one embodiment, the acquired images are superimposed (e.g., with a 50% transparency) over Google Map® tiles or aerial geographic images and displayed to the user. Alternatively, aerial images may be processed and displayed with Google Map® tiles or aerial geographic image such that they are displayed in a locked side-by-side orientation, such that moving and/or zooming one image moves and/or zooms the other image by the same amount. The center points of the images in the side-by-side orientation may be indicated with an icon (e.g., cross-hairs), similar to the techniques described in International Patent Application Publication No. WO 2014/026183. In another embodiment, a sequence of aerial images taken at different times during a growing season (e.g., daily, weekly, monthly, etc.) are processed into an animation that steps through the images in sequence. In some embodiments, the animation is played automatically by displaying the images for set time periods; in other embodiments, the next sequential image is displayed in response to a user input on a graphical interface (e.g., selection using an arrow icon or dragging a slider icon across a scale). The animation may be superimposed over Google Map® tiles or aerial geographic images. The images may be, for example, NDVI images, aerial maps, and/or emergence maps.

Processing images may also include filtering the images using software to filter out dirt and shadows that may affect image quality. The filtering creates a color contrast between the plant canopy and dirt, which may be difficult to distinguish from one another in the unfiltered image. For example, in one embodiment, image processing removes anything in the aerial photograph below a threshold reflectance or color value.

In one example, an expected greenness density is identified based on a planted population and/or a development stage of plants in the imaged area. The planted population may be determined from an as-planted map, and the development stage may be determined, for example, using a hybrid-specific chart that relates the number of growing degree days to an expected development stage. Once the expected greenness density is identified, everything in an image that is above the expected greenness density may be depicted in shades of green, and everything in the image that is below the expected greenness density may be depicted in shades of red.

System 100 may also use imaging data to generate emergence maps in which a number of plants per area is calculated, and areas devoid of plants or desired greenery in the images are marked as "blanks." Blanks are areas where plants or greenery either failed to grow or were not initially planted. In one embodiment, system 100 correlates the blank data with initial planting data (e.g., the as-planted map) to remove any blanks that occurred due to no initial planting, leaving only true blanks that are indicative of areas where seeds were planted, but did not emerge. This processing can be applied to NDVI image data or other image data acquired by camera system 117.

In some embodiments, spatial application decisions may be made automatically based on images acquired by UAV 110. For example, levels of an NDVI map may be associated with a post-planting application (e.g., side-dressing or crop dusting) to generate an application map based on the NDVI map. The generated application map may be displayed to the user to allow the user to reject, modify, or accept the application map. In some embodiments, the generated application map is transmitted to a service provider (e.g., an employee or third-party contractor) with instructions to apply the application map.

The data acquired by UAV 110 may also be used to make general agronomic recommendations. For example, if an NDVI map generated using system 100 has a nitrogen level below a threshold, system 100 may recommend that nitrogen be applied by a sidedress to increase nitrogen levels. The threshold may be determined based on a development stage of the crop, for example. In another example, if a plant health map indicates an area of healthy plants is below a threshold, system 100 may recommend that nitrogen be applied by a sidedress. In yet another example, if an emergence map has an emergence area below a threshold prior to a critical time in development, system 100 may recommend the field be replanted.

Figure 5:
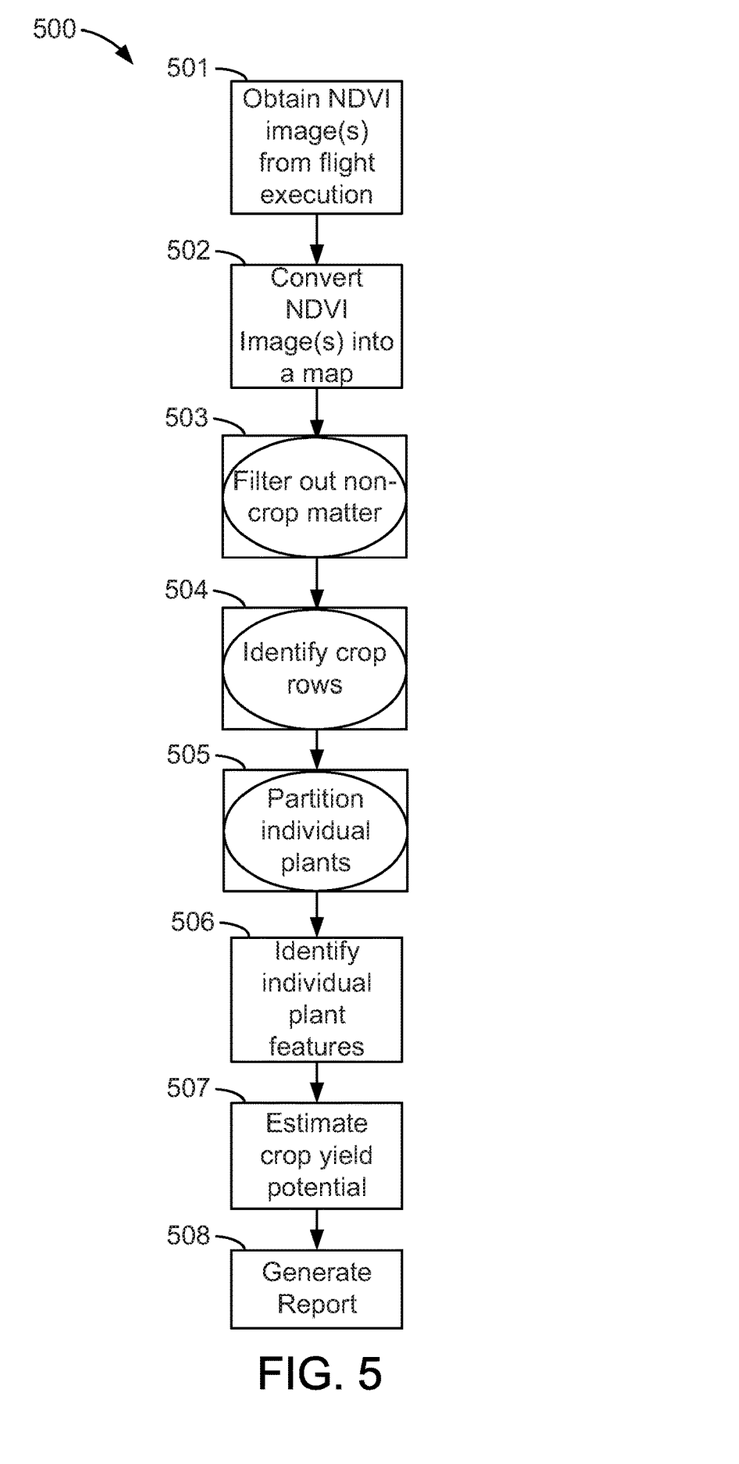
FIG. 5 is a flowchart of a post flight data transfer/processing stage of the method shown in FIG. 2.

Referring to FIG. 5, an example of data transfer/processing stage 203 of method 200 is indicated generally at 500. Data transfer/processing stage 500 of method 200 includes a sequence of actions performed by the user and system 100. In FIG. 5, actions performed by the user are shown in a circle and actions performed by system 100 are shown in a square.

Data transfer/processing stage 500 generally includes the following eight stages: obtaining NDVI image(s) from flight execution stage 501; converting NDVI image(s) into a map stage 502; filtering out non-crop matter stage 503; identifying crop rows stage 504; partitioning individual plants stage 505; identifying individual plant features stage 506; estimating crop yield potential stage 507; and generating report stage 508.

In the example method 200, post flight data transfer/processing stage 500 begins with system 100 obtaining NDVI image(s) from flight execution 501. Again, data transfer/processing may occur while UAV 110 is still airborne such that data transfer/processing stage 500 overlaps flight execution stage 400. Data transfer/processing stage 500 may occur in real-time as the data is captured by UAV 110, or shortly thereafter (e.g., within 10 minutes of data capture).

Figure 6:
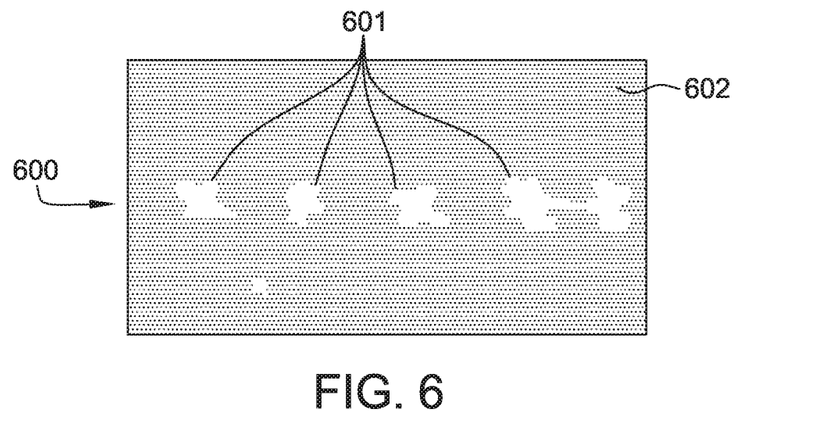
FIG. 6, FIG. 7, FIG. 8, FIG. 9, FIG. 10, FIG. 11 are examples of maps that may be created by the system shown in FIG. 1.

In this example, images obtained from flight execution are converted by system 100 into a map 502 (e.g., a bitmap, an emergence map, etc.). In one embodiment, an expected greenness density is established based on a planted population and/or a development stage of plants in the imaged area. Once the expected greenness density is identified, in the generated map, pixels in each image that are above the expected greenness density are depicted in white, and pixels in the image that are below the expected greenness density are depicted in black. Accordingly, a map is created with unitary white spaces 601 correlating approximately to the location and area of each plant in the images. An example map 600 is provided in FIG. 6. In FIG. 6, individual plants in the planted population (identified using the expected greenness density) are depicted as white spaces 601. Surrounding features 602 (e.g., surrounding soil, weeds, etc.) are lightly shaded. Until further processing, the map may include single white spaces 601 that include multiple plants (e.g., shown on the right side of map 600) and/or white spaces 601 that are weeds or other non-crop plant matter (e.g., shown on the lower left side of map 600).

Figure 7:
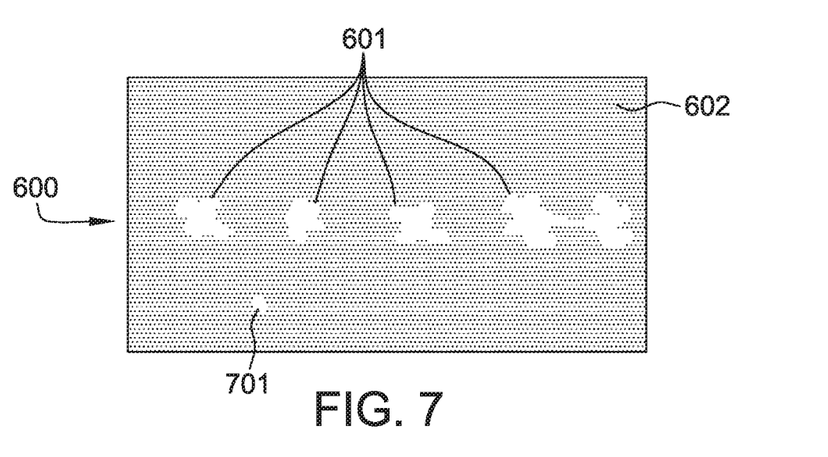
Figure 8:
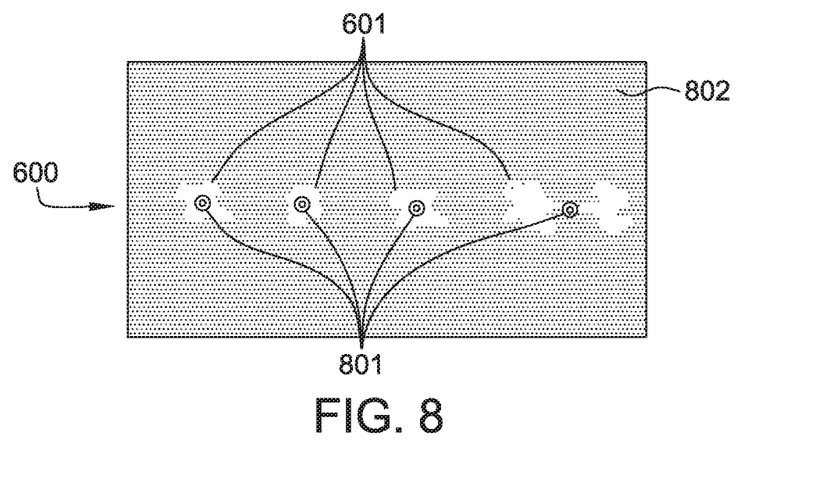

Filtering out non-crop matter stage 503 in the example method includes identifying "anomalies" in the generated map. "Anomalies", as used herein, refer to areas in the generated map that are initially identified by system 100 as a white space 601 (e.g., based on greenness density), but do not actually represent a desired plant from the planted population. For example, a weed may be an anomaly in the generated map. Stage 503 also includes filtering these anomalies from map 600. In this example, system 100 identifies anomalies by calculating a size (e.g., area, diameter, etc.) for each white space 601, and then anomalies are identified as white spaces with a size substantially different than (e.g., 2 standard deviations from) the typical (e.g., mean, median, average, etc.) size of white spaces 601 in map 600. An example anomaly is shown generally in FIG. 7 as anomaly white space 701. System 100 filters out anomalies by shading anomalies the same color as surrounding features 602 or removing anomalies from further consideration in method 500. FIG. 8 shows an example map 600 with anomaly white space 701 removed. In another embodiment, system 100 compares the anomalies with initial planting data (e.g., an as-planted map) to remove any anomalies that occur in areas where there was no initial planting. Accordingly, system 100 filters anomalies by shading them appropriately or removing them from further consideration. This processing can be applied to NDVI image data or other image data acquired by camera system 117.

Figure 9:
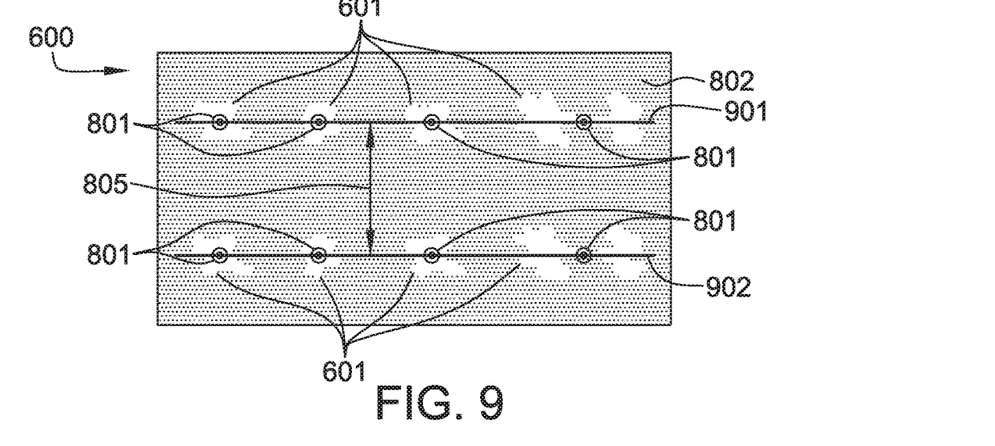

Identifying crop rows stage 504 in the example method includes marking a centroid 801 for each remaining white space 601. FIG. 8 shows an example map 600 with a row 802 of white spaces 601 marked with centroids 801. FIG. 9 shows another example map 600 with two rows 901 and 902 of white spaces 601 marked with centroids 801. System 100 identifies rows (e.g., 802, 901, 902) by calculating, approximating, and assigning best fit lines to the rows based on positions of centroids 801. Specifically, system 100 uses a row spacing distance 805, which may be either a standard value (e.g. 30 inches) or a user entered value, to identify approximate locations of parallel rows through white spaces 601 and/or centroids 801. In other embodiments, stage 504 may overlap or occur at the same time as stage 503 to assist system 100 with identifying anomalies.

Figure 10:
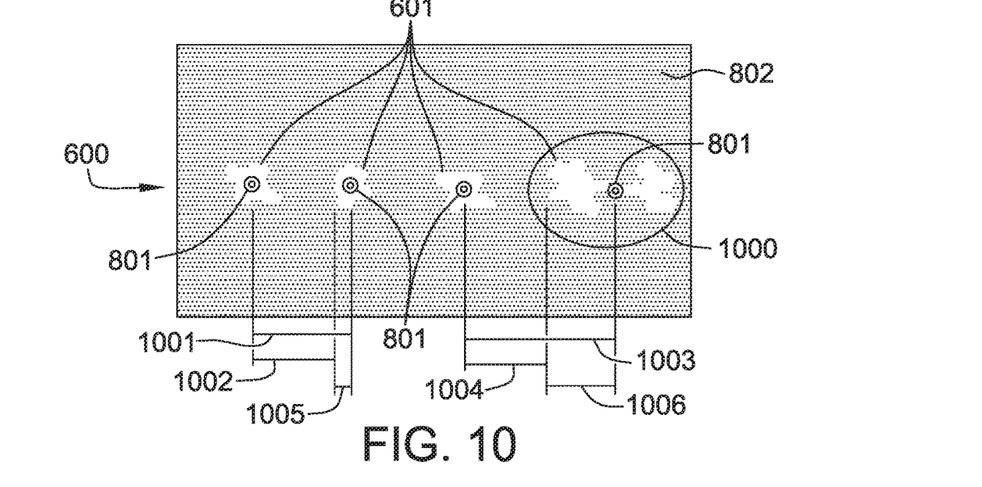

Partitioning individual plants stage 505 in the example method includes identifying two or more overlapping white spaces 601 (i.e., two or more overlapping plants). FIG. 10 shows an example of an overlapping pair of white spaces 601 within circle 1000. In the example method, to identify an overlapping pair of white spaces 601, system 100 first compares (i) in-row spacing (e.g., 1001 and 1003) between adjacent centroids; and (ii) in-row spacing value (e.g., 1002 and 1004) determined by (a) a nominal value from the user, (b) an as-planted spacing value from an as-planted map, or (c) the median or average spacing between in-row plants. In the instance of an overlapping pair of white spaces 601, such as those shown in circle 1000 in FIG. 10, a difference 1005 between spacing 1003 and 1004 is markedly larger than a difference 1006 between spacing 1001 and 1002. As a separate step or as part of the same step in identifying an overlapping pair of white spaces 601, system 100 may also calculate and compare the median area of white spaces 601. Accordingly, system 100 is able to identify the overlapping pair of white spaces 601 (e.g., within circle 1000) using the above-described analysis. Upon identification of an overlapping pair of white spaces 601, as shown for example in FIG. 11, system 100 partitions individuals plants by re-assigning two centroids 801 to mark the location of individual white spaces 601 equidistant from the location 1100 of deleted centroid 801.

Figure 11:
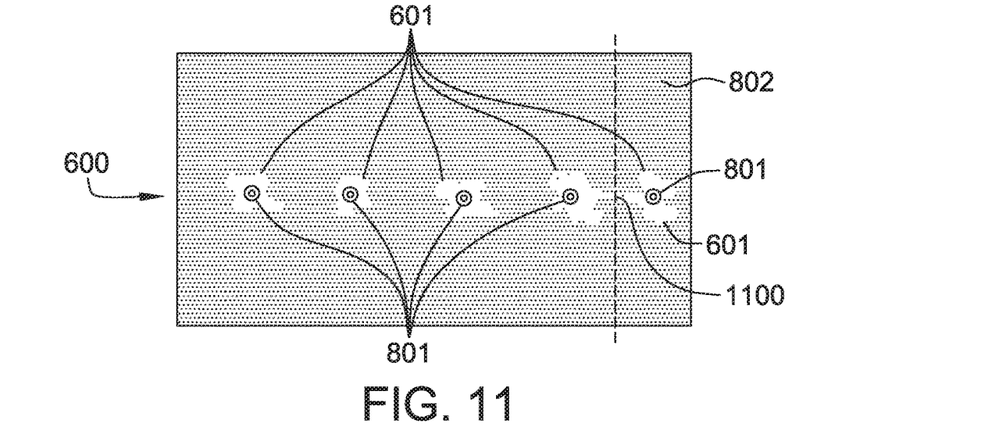

In this example, system 100 also assigns a "confidence value" (e.g., 90%) to each white space 601 indicating the statistical probability or certainty that each white space 601 correlates to the location and/or area of a distinct plant in the images. In one example, the confidence value for an individual white space 601 is higher when (i) the location of its centroid 801 is approximately equal to an in-row spacing value (e.g., 1002 and 1004); and (ii) its area is approximately equal to the median and/or average area of white spaces 601 on map 600. Accordingly, system 100 may store the confidence value for each white space 601 on each map 600 to reference for various purposes, as described below.

Identifying individual plant features stage 506 in the example method includes both correcting images captured by camera system 117 and analyzing individual plants (e.g., those identified within white spaces 601). In this example, system 100 corrects aerial images captured by camera system 117 by considering an image data point (e.g., the location, elevation, and speed of UAV 110 when each image was taken, the resolution of camera system 117, the angle and zoom used by camera system 117, etc.) and in-row and parallel-row spacing measurements identified in stages 504 and 505 described above. More specifically, system 100 assigns a scale to each pixel in each image by comparing the known in-row or parallel-row spacing measurements (e.g., in inches) to the known in-row or parallel-row image spacing measurements (e.g., in pixels).

In another example, correcting images captured by camera system 117 may include a "Go Back and Scout" route 407 by UAV 110 to take additional high resolution pictures of target areas.

In this example, system 100 also analyzes individual plants (e.g., those identified within white spaces 601) by examining one or more images of each plant captured by camera system 117 from differing positions and elevations. Similar to stage 504 where each white space 601 is marked with a centroid 801, system 100 locates structures (e.g., leaves, stalks, ears, etc.) of each plant and marks each structure with a centroid. In one example, system 100 locates plant structures using a length:width ratio for structures consistent with the planted population. Further, leaf spines may be located by calculating midpoints between leaf edges. In this example, system 100 also locates an updated, more precise centroid of the plant using centroids from the individual plant structures. In another example, system 100 may use an intersection point of lines fitted along the length or width and through the centroid of a plurality of plant structures (e.g., leaf spines) to find the updated plant centroid. Still in other embodiments, system 100 may return to previous stages to improve white space 601 identification and/or centroid 801 placements, for example.

In this example, system 100 uses the images and plant structure location to determine data regarding the characteristics of plants in the planted population. Plant characteristics of particular interest, for example, suitably include without limitation leaf length (e.g., average spine length), width, and area (e.g., of the entire plant) and number of leaves (which may be, for example, the number of spines identified). Again, system 100 may use image data points to adjust for unclear or skewed views of plant characteristics. Accordingly, system 100 may store the information regarding plant characteristics for each plant to reference for various purposes described below.

Estimating crop yield potential stage 507 in the example method includes using information gathered and calculated by system 100 to estimate a yield potential. Information gathered includes, for example, the number of plants in the planted population, the confidence value for each white space 601, and/or information regarding plant characteristics. In this example, system 100 may not consider plant characteristics when a confidence value for a particular plant is below a first threshold (e.g., 95%). Also in this example, system 100 may not include that particular plant for the planted population stand count when the confidence value is below a second, lower threshold (e.g., 80%).

In one example, system 100 may use the following Equation 1 to estimate a plant or planted population yield potential:

$$\text{yield potential} = Ax + By + Cz \quad \text{Equation 1:}$$

where,
x=number of leaves
y=leaf area
z=maximum leaf length or average of two longest leaves
A=0, if x<threshold value; A>0, if x>threshold value
B=0, if x<threshold value; B>0, if x>threshold value
C=0, if x<threshold value; C>0, if x>threshold value In one example, system 100 may calculate an ear potential using a Boolean approach. For example, if any two variables (e.g., number of leaves, leaf area, maximum leaf length) are above a predetermined threshold associated with each variable, then the ear potential is set at 1. Otherwise, the ear potential is set at 0. It should be appreciated that the threshold values used to determine yield or ear potential may be selected to require a high confidence (e.g., 99%) that the plant has the classified potential, or to require only a relatively low confidence (e.g., 80%).

In another example, the plant characteristics (number of leaves, leaf area, leaf length, etc.) used to calculate yield/ear potential are relative to other plants in the field. The may be, for example, relative to neighboring or nearby plants, or relative to a mean/average number for the image and/or field. For example, system 100 may use the following Equation 2 to estimate a plant or planted population yield potential, based on relative plant characteristics:

$$\text{yield potential} = A(x-l) + B(y-m) + C(z-n) \quad \text{Equation 2:}$$

where,
x=number of leaves on one plant
y=leaf area on one plant
z=maximum leaf length or average of two longest leaves on one plant
l=average number of leaves on plants in the same image or planted population
m=average leaf area on plants in the same image or planted population
n=average maximum leaf length or average of two longest leaves on plants in the same image or planted population
A=0, if x<threshold value; A=1, if x>threshold value
B=0, if x<threshold value; B=1, if x>threshold value
C=0, if x<threshold value; C=1, if x>threshold value In both Equations 1 and 2, the threshold value for determining A, B, and C may be (i) a nominal value from the user; (ii) an expected value based on previous planted populations; (iii) an extrapolated value from individual plants; or (iv) an interpolated value from larger planted populations.

Generating report stage 508 in the example method includes creating a map or report of data regarding the planted population. In this example, the map generated compares the as-planted map with another map later in the development of the planted population. The map may show, for example, regularity of plant spacing, skipped plantings, double planted plants, etc. Also in this example, the report generated may include a potential or generated yield (e.g., number of ears, seeds, stalks, etc.) from the planted population.

In some embodiments one or more measurements and spatial maps may be generated and displayed to the user based on information gathered from aerial imagery.

In one embodiment, a weed pressure value is determined for each location or region in the field based upon the relative amount of weeds in the standing crop. The weed pressure value is preferably related to the amount of green plant matter identified between the rows of a row crop. For example, the weed pressure value may be determined for a region A in the field by dividing the area of "anomalies" identified as described above within the region A by the total area of the region A. In some such methods, weeds are distinguished from other anomalies or from crop material based on a shape or size criterion of the weed; for example, anomalies having a total area or width less than a threshold may be ignored for purposes of calculating a weed pressure value. The weed pressure value determined for locations throughout the field may then be displayed as a field or region value or presented as a spatial weed pressure map.

In another embodiment, the leaf width of crop plants identified in the field (determined as described above) is reported as a field average or presented to the user as a spatial map of average leaf width in the field.

In another embodiment, an estimated emergence date of identified crop plants is determined for each plant or region of the field. The estimated emergence date may be estimated based on the size of each identified crop plant; additionally, where no crop plants are observed in a portion of the field at a given date the emergence date for that portion of the field may be assumed to be after that date. The spatial variation in estimated emergence date may be presented to the user as a map or may be used to improve estimations of plant moisture or plant maturity later in the season, e.g., when determining a recommended harvest date. It should be appreciated that for field-wide operational decisions, the latest emergence date should be used; for example, a delay of one day in the latest emergence date determined for the field may result in a one day delay in the recommended harvest date.

In another embodiment, an estimated plant vigor of crop plants identified in the field is reported as a field average or presented to the user as a spatial map of plant vigor in the field. The plant vigor value for each plant or group of plants is preferably determined by calculating a weighted sum or product of plant characteristics (e.g., leaf width and number of leaves). For example, a plant vigor value for a crop plant may be calculated by multiplying the average leaf width by the number of leaves or by adding the average leaf width to a value 10 times the number of leaves. A statistical variation (e.g., standard deviation) of the plant vigor value with respect to the mean plant vigor value for the field (or for a region including multiple fields) may also be measured and used to generate a spatial map of plant vigor deviation.

In another embodiment, a plant disease identification is determined by comparing the reflectivity (e.g., visual spectrum, infrared or NDVI value) of portions of a single identified crop plant to a threshold value or to the average reflectivity value of the crop plant. If one or more portions of a crop plant has a reflectivity greater than the selected reflectivity threshold (and preferably has an area greater than an area threshold), the user is preferably alerted to potential disease and may be presented with a photographic image of the crop plant.

In another embodiment, a pest identification is determined by comparing the reflectivity (e.g., visual spectrum, infrared or NDVI value) of portions of a single identified crop plant to a threshold value or to the average reflectivity value of the crop plant. If one or more portions of a crop plant has a reflectivity greater than the selected reflectivity threshold (and preferably has an area greater than an area threshold), the user is preferably alerted to potential pest presence and may be presented with a photographic image of the crop plant.

Because the pest and disease identification methods discussed above may be improved by higher-resolution imagery, in some embodiments the UAV 110 returns to areas having poor NDVI values (either those selected by the user or those having sub-threshold NDVI values) and captures a high-resolution image, e.g., by flying at lower altitudes (e.g., 20 feet or lower) over the identified area or hovering (i.e., pausing at a stationary position) over the identified area and taking an image at a higher resolution and/or greater zoom level than during the initial NDVIA image capture flight. When obtaining low-altitude photos (e.g. 20 feet or lower), the UAV 110 preferably determines its distance to the ground to avoid collisions due to unknown changes in elevation. In some embodiments, the distance-to-ground may be determined using a sonar device on the UAV. In other embodiments, the distance-to-ground may be determined by processing an image and determining the number of pixels between crop rows and calculating the distance-to-ground based on the known distance between rows and known image-gathering settings such as the camera field of view and zoom level.

In some embodiments, the yield potential and/or ear potential of plants (e.g., seedling-stage plants) as discussed above may be alternatively determined by taking images of the crop at a significant angle (e.g., between 30 and 60 degrees) relative to vertical in order to observe and compare the height of individual plants. Plants shorter than neighboring plants by a threshold percentage are preferably identified as late-emerging plants having a lower yield potential.

In some embodiments, the orientation of identified crop plants may be determined by determining the plant orientation (e.g., relative to north) of a line best fitting through the spines of one or more leaves (e.g., a line running through two opposing leaves separated by 180 degrees about the stalk). A correlation of plant orientation to a yield performance may be determined based on later-developed yield map for the same field. A yield or ear potential prediction may be generated based in part on the plant orientation of each plant; for example, the yield potential may be reduced by 1 bushel per acre for each 5 degree-decrease in average plant orientation relative to north (i.e., in the angular offset of the leaves relative to north) per acre. In addition, a stalk diameter measurement taken from an aerial image (preferably at a significant angle from vertical, e.g., 45 degrees) or by a land-based camera to the side of the stalk may be improved by determining the orientation of the stalk based on the plant orientation. For example, the aerial or land-based image taken for stalk diameter measurement may be taken at a desired stalk measurement angle, e.g., normal to the plant orientation. In other embodiments, the stalk diameter measurement may be reduced by a factor related to the difference between the angle of the image relative to the stalk and the desired stalk measurement angle. The stalk diameter measurement may be used to modify the predicted yield or ear potential; for example, the predicted yield may be increased by 1 bushel per acre for every 0.5 cm increase in measured stalk diameter.

In some embodiments of the methods described herein, a measurement based on an image of a first portion of the field may be generalized to a larger portion of the field for purposes of generating a map of the measurement across the field. In some such embodiments, the larger portion of the field may comprise an area surrounding and/or adjacent to the first portion of the field. In other embodiments, the larger portion of the field may comprise a management zone (e.g., an adjacent or surrounding region of the field having a common soil type, yield range, planted hybrid type, or other characteristic or applied farming practice).

When introducing elements of the present invention or the embodiments thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawing figures shall be interpreted as illustrative and not in a limiting sense.

What is claimed is:

1. A method for agronomic and agricultural monitoring, the method comprising:
   monitoring, by a first central processing unit (CPU) at a base station, an unmanned aerial vehicle (UAV) as the UAV flies along a flight path above an area and as the UAV performs:
   capturing, by a second CPU of the UAV as the UAV flies along the flight path, a plurality of initial images of the area and capturing one or more additional different images of one or more target areas suspected of having one or more anomalies;
   orthorectifying and stitching the plurality of initial images into a first single continuous area image;
   orthorectifying and stitching the one or more additional different images into a second single continuous area image;
   superimposing the first single continuous area image onto the second single continuous area image to generate a superimposed image;
   partitioning the superimposed image into one or more areas, each area corresponding to one plant of a plurality of plants;
   identifying, in the one or more areas, one or more structures, each structure corresponding to part of at least one plant of a plurality of plants depicted in the superimposed image;
   for each area of one or more areas:
   determining, based on the one or more structures, whether at least one anomaly, of the one or more anomalies, is present in an area; and in response to determining, based on the one or more structures, that at least one anomaly, of the one or more anomalies, is present in the area, generating one or more agronomic recommendations for addressing the at least one anomaly, of the one or more anomalies, in the area.

2. The method of claim 1, wherein the one or more anomalies include one or more of: white spaces determined based on a greenness density and that do not represent any desired plant from a planted population.

3. The method of claim 1, wherein the one or more anomalies include one or more of non-crop matters such as weeds, pests, or stalks affected by diseases.

4. The method of claim 1, wherein the one or more anomalies include a weed anomaly which is identified by determining a weed pressure value for a structure from the one or more structures by dividing a size of the structure by a size of the area.

5. The method of claim 1, wherein a plant disease anomaly is identified by comparing a reflectivity of a crop plant identified in a structure of the one or more structures to a threshold value or to an average reflectivity value of the crop plant.

6. The method of claim 1, wherein a pest anomaly is identified by comparing a reflectivity of a crop plant identified in a structure of the one or more structures to a threshold value or to an average reflectivity value of the crop plant.

7. The method of claim 1, wherein a pest anomaly is identified by collecting one or more high-resolution images for one or more high-resolution structures and comparing a reflectivity of a crop plant identified in a high-resolution structure of the one or more high-resolution structures to a threshold value or to an average reflectivity value of the crop plant.

8. The method of claim 1, further comprising:
based on at least the one or more anomalies, generating a report indicating one or more regions having certain characteristics comprising one or more of: low nitrogen levels, low crop maturity levels, or high crop shadow levels;
using the UAV, sending the report to a computing device;
receiving, from the computing device, instructions to acquire one or more new images of one or more new target areas;
receiving, from the computing device, the one or more new images of the one or more new target areas; and
identifying the one or more anomalies based on, at least in part, the one or more new images.

9. The method of claim 1, further comprising: based on the plurality of initial images and the one or more additional different images, determining a greenness density map for the area, wherein the greenness density map has an expected greenness density area depicted in a first color and other areas depicted in a second color.

10. The method of claim 1, further comprising: processing, using the base station or a cloud computer, the plurality of initial images and the one or more additional different images by performing one or more of:
based on the plurality of initial images and the one or more additional different images, generating at least one of a normalized difference vegetation index map, or an application map for the area;
based on the plurality of initial images and the one or more additional different images, determining an emergence map for the area;
based on the plurality of initial images and the one or more additional different images, generating at least one of a normalized difference vegetation index map, or an application map;
based on the plurality of initial images and the one or more additional different images, generating one or more agronomic recommendations for the area; and
wherein the processing of the plurality of initial images and the one or more different images is performed at one or more of: the base station, or a cloud system.

11. A system for agronomic and agricultural monitoring, the system comprising:
one or more processors, one or more memory units, one or more non-transitory computer-readable storage media storing one or more computer instructions which, when executed by the one or more processors, cause the one or more processors to perform:
monitoring, by a first central processing unit (CPU) at a base station, an unmanned aerial vehicle (UAV) as the UAV flies along a flight path above an area and as the UAV performs:
capturing, by a second CPU of the UAV as the UAV flies along the flight path, a plurality of initial images of the area and capturing one or more additional different images of one or more target areas suspected of having one or more anomalies;
orthorectifying and stitching the plurality of initial images into a first single continuous area image;
orthorectifying and stitching the one or more additional different images into a second single continuous area image;
superimposing the first single continuous area image onto the second single continuous area image to generate a superimposed image;
partitioning the superimposed image into one or more areas, each area corresponding to one plant of a plurality of plants;
identifying, in the one or more areas, one or more structures, each structure corresponding to part of at least one plant of a plurality of plants depicted in the superimposed image;
for each area of one or more areas:
determining, based on the one or more structures, whether at least one anomaly, of the one or more anomalies, is present in an area; and
in response to determining, based on the one or more structures, that at least one anomaly, of the one or more anomalies, is present in the area, generating one or more agronomic recommendations for addressing the at least one anomaly, of the one or more anomalies, in the area.

12. The system of claim 11, wherein the one or more anomalies include one or more of: white spaces determined based on a greenness density and that do not represent any desired plant from a planted population.

13. The system of claim 11, wherein the one or more anomalies include one or more of non-crop matters such as weeds, pests, or stalks affected by diseases.

14. The system of claim 11, wherein a weed anomaly is identified by determining a weed pressure value for a structure from the one or more structures by dividing a size of the structure by a size of the area.

15. The system of claim 11, wherein a plant disease anomaly is identified by comparing a reflectivity of a crop plant identified in a structure of the one or more structures to a threshold value or to an average reflectivity value of the crop plant.

16. The system of claim 11, wherein a pest anomaly is identified by comparing a reflectivity of a crop plant identified in a structure of the one or more structures to a threshold value or to an average reflectivity value of the crop plant.

17. The system of claim 11, wherein a pest anomaly is identified by collecting one or more high-resolution images for one or more high-resolution structures and comparing a reflectivity of a crop plant identified in a high-resolution structure of the one or more high-resolution structures to a threshold value or to an average reflectivity value of the crop plant.

18. The system of claim 11, wherein the one or more non-transitory computer-readable storage media store additional instructions which, when executed by the one or more processors, cause the one or more processors to perform:
- based on at least the one or more anomalies, generating a report indicating one or more regions having certain characteristics comprising one or more of: low nitrogen levels, low crop maturity levels, or high crop shadow levels;
- using the UAV, sending the report to a computing device;
- receiving, from the computing device, instructions to acquire one or more new images of one or more new target areas;
- receiving, from the computing device, the one or more new images of one or more new target areas; and
- identifying the one or more anomalies based on, at least in part, the one or more new images.

19. The system of claim 11, wherein the one or more non-transitory computer-readable storage media store additional instructions which, when executed by the one or more processors, cause the one or more processors to perform:
based on the plurality of initial images and the one or more additional different images, determining a greenness density map for the area, wherein the greenness density map has an expected greenness density area depicted in a first color and other areas depicted in a second color.

20. The system of claim 11, wherein the one or more non-transitory computer-readable storage media store additional instructions which, when executed by the one or more processors, cause the one or more processors to perform:
- processing, using the base station or a cloud computer, the plurality of initial images and the one or more additional different images by performing one or more of:
- based on the plurality of initial images and the one or more additional different images, generating at least one of a normalized difference vegetation index map, or an application map for the area;
- based on the plurality of initial images and the one or more additional different images, determining an emergence map for the area;
- based on the plurality of initial images and the one or more additional different images, generating at least one of a normalized difference vegetation index map, or an application map;
- based on the plurality of initial images and the one or more additional different images, generating one or more agronomic recommendations for the area; and
- wherein the processing of the plurality of initial images and the one or more different images is performed at one or more of: the base station, or a cloud system.

\* \* \* \* \*